US011549556B2

(12) United States Patent
Berruet et al.

(10) Patent No.: US 11,549,556 B2
(45) Date of Patent: Jan. 10, 2023

(54) COMBINED INSULATOR AND CONDUCTOR ASSEMBLY FOR BEARINGS WITH PRONG-LOCKED CONDUCTOR

(71) Applicant: AKTIEBOLAGET SKF, Gothenburg (SE)

(72) Inventors: Nicolas Berruet, Artannes sur Indre (FR); Paul Feliciano, Saint Cyr-sur-Loire (FR); Mathieu Hubert, Turin (IT); Tommy Jullien, Ambillou (FR); Gene A Kovacs, Brighton, MI (US); Thomas Perrotin, Saint Roch (FR); David Christopher Rybski, White Lake, MI (US); Anthony Simonin, Tours (FR); Collin Snyder, Northville, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 17/329,375

(22) Filed: May 25, 2021

(65) Prior Publication Data

US 2021/0364041 A1 Nov. 25, 2021

(30) Foreign Application Priority Data

May 25, 2020 (IT) .......................... 102020000012151

(51) Int. Cl.
*F16C 41/00* (2006.01)
*F16C 19/06* (2006.01)

(52) U.S. Cl.
CPC ............ *F16C 41/002* (2013.01); *F16C 19/06* (2013.01)

(58) Field of Classification Search
CPC ...... F16C 19/06; F16C 35/077; F16C 41/002; F16C 2202/24; F16C 2202/32
See application file for complete search history.

(56) References Cited

U.S. PATENT DOCUMENTS

| 4,801,270 | A | 1/1989 | Scarlata |
| 5,735,615 | A | 4/1998 | Pontzer |

(Continued)

FOREIGN PATENT DOCUMENTS

| DE | 202014105015 U1 | 10/2014 |
| DE | 102017106695 B3 | 4/2018 |

(Continued)

*Primary Examiner* — James Pilkington
(74) *Attorney, Agent, or Firm* — J-Tek Law PLLC; Scott T. Wakeman; Mark A. Ussai

(57) ABSTRACT

A combined insulator and conductor assembly is for a bearing disposable between a shaft and a housing and includes an annular insulator disposeable about the bearing outer ring. The insulator is configured to prevent electric current flow between the outer ring and the housing and includes one or more axial mounting tabs. An electrical conductor has an outer radial end, an inner radial end and at least one retainer, the at least one retainer being engageable with the at least one mounting tab to releasably couple the conductor with the insulator. Each retainer includes a radially-extending prong engageable with a separate tab. The conductor outer radial end or/and a portion of the conductor between the outer and inner ends is conductively engageable with the housing and the conductor inner radial end being conductively engageable with the shaft so as to provide a conductive path between the shaft and the housing.

20 Claims, 10 Drawing Sheets

(56) References Cited

U.S. PATENT DOCUMENTS

| | | |
|---|---|---|
| 7,528,513 B2 | 5/2009 | Oh |
| 9,581,203 B2 * | 2/2017 | White ................. F16C 33/62 |
| 10,050,490 B1 | 8/2018 | Hubert et al. |
| 10,253,818 B1 | 4/2019 | Ince et al. |
| 10,422,384 B2 | 9/2019 | Hubert et al. |
| 10,931,179 B2 | 2/2021 | Hubert et al. |
| 10,941,809 B2 | 3/2021 | Colton et al. |
| 11,204,066 B2 | 12/2021 | Feliciano et al. |
| 2003/0086630 A1 | 5/2003 | Bramel et al. |
| 2005/0265643 A1 | 12/2005 | Alsina et al. |
| 2014/0131512 A1 | 5/2014 | Gyuricsko |
| 2016/0312834 A1 | 10/2016 | White et al. |
| 2019/0226526 A1 | 7/2019 | Hubert et al. |
| 2019/0296617 A1 | 9/2019 | Hubert et al. |
| 2020/0224719 A1 | 7/2020 | Colton et al. |
| 2021/0310517 A1 * | 10/2021 | Berruet ................. F16C 19/52 |
| 2021/0310518 A1 * | 10/2021 | Berruet ................ F16C 41/002 |
| 2021/0310520 A1 | 10/2021 | Arnault et al. |
| 2021/0364040 A1 | 11/2021 | Arnault et al. |

FOREIGN PATENT DOCUMENTS

| | | |
|---|---|---|
| DE | 102019200397 A1 | 7/2019 |
| FR | 1325720 A | 5/1963 |
| JP | 2015095440 A | 5/2015 |
| WO | 2016171929 A1 | 10/2016 |

* cited by examiner

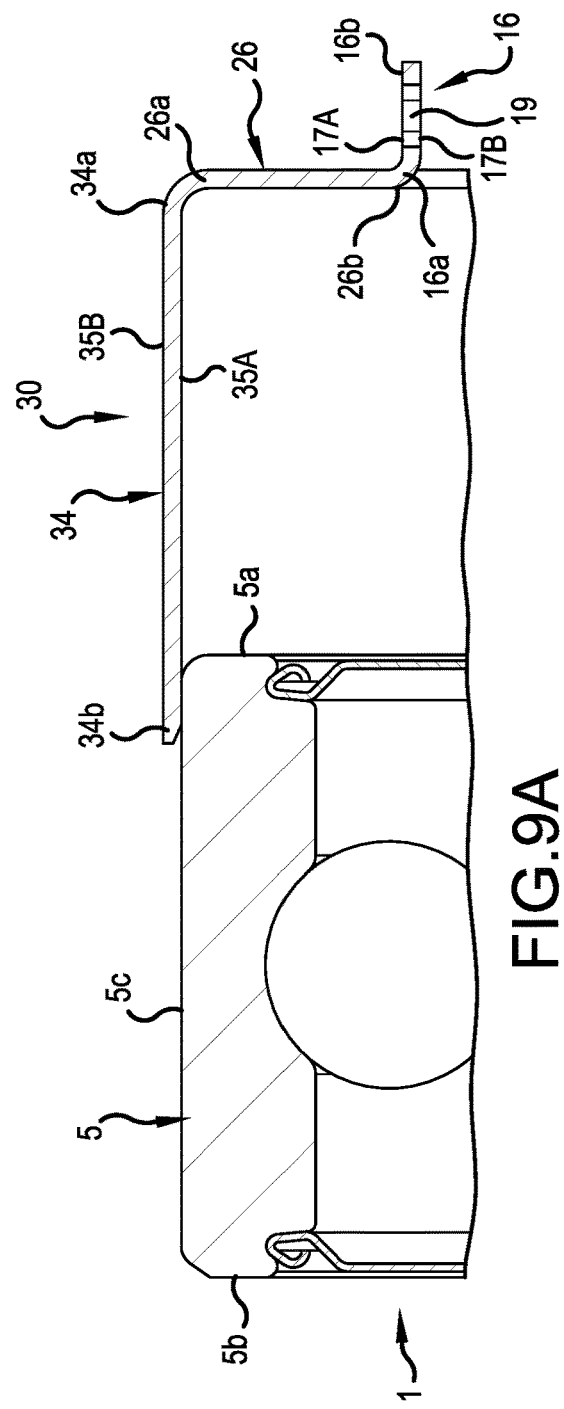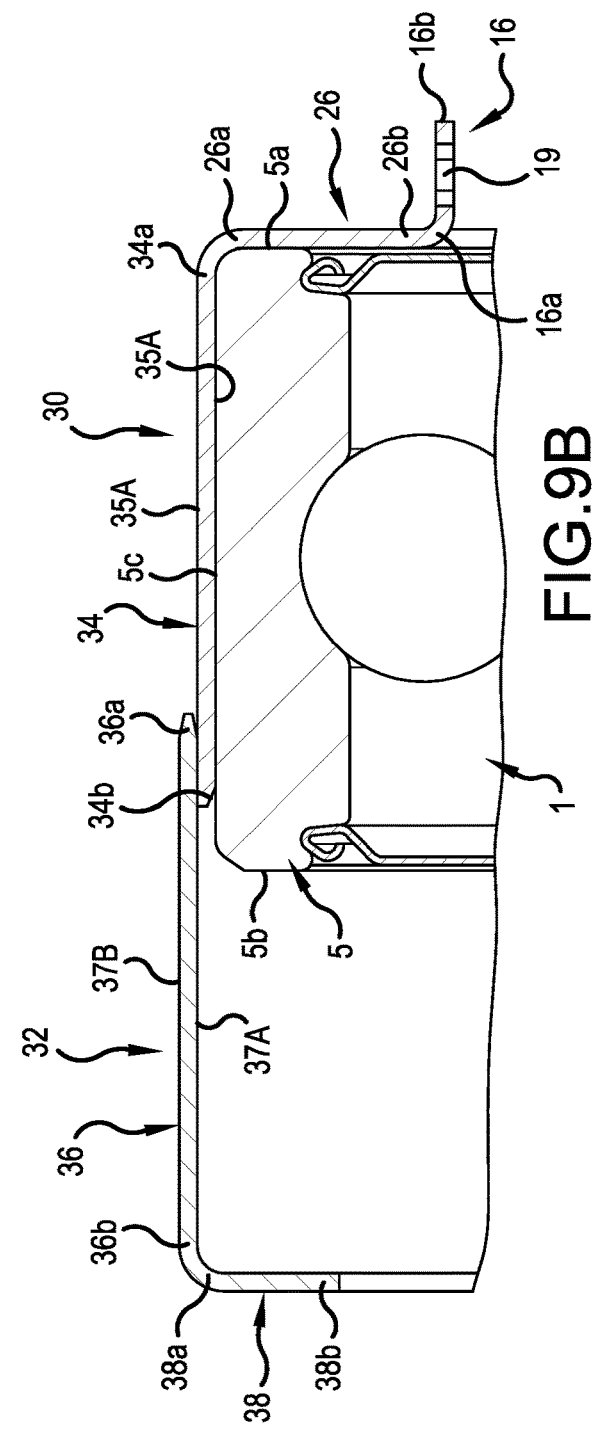

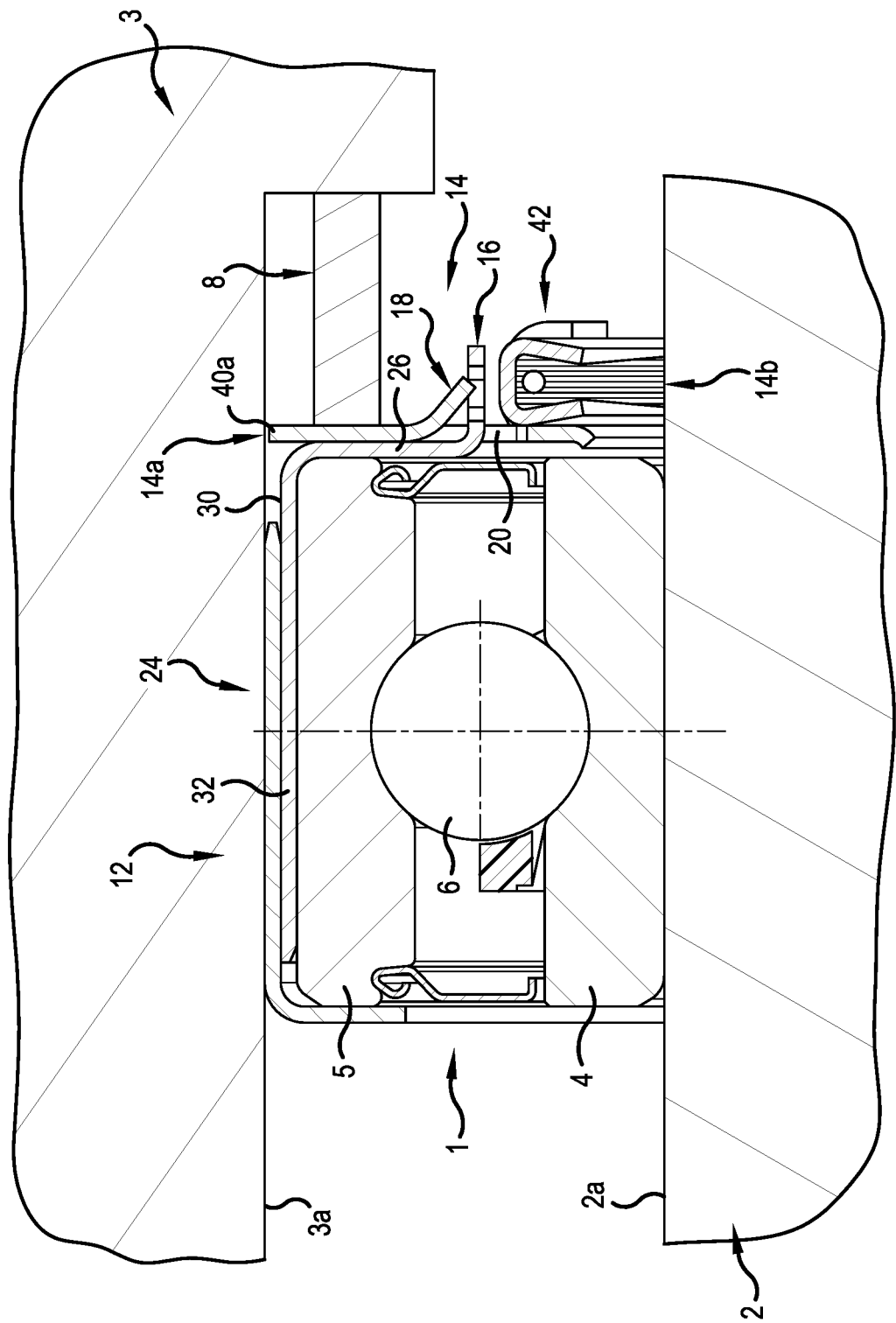

COMBINED INSULATOR AND CONDUCTOR ASSEMBLY FOR BEARINGS WITH PRONG-LOCKED CONDUCTOR

CROSS-REFERENCE

This application claims priority to Italian Patent Application No. 102020000012151, filed May 25, 2020, the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. Other devices or mechanisms are provided to electrically insulate the bearing in order to prevent current from passing through the bearing and may include insulative coatings or coverings.

SUMMARY OF THE INVENTION

A combined insulator and conductor assembly is provided for a bearing disposable between a shaft and a housing, the bearing having an inner ring, an outer ring with opposing first and second axial ends, and a plurality of rolling elements between the rings, the shaft having an outer circumferential surface and the housing having an inner circumferential surface. The assembly comprises an annular insulator disposable about the bearing outer ring, configured to prevent electric current flow between the outer ring and the housing and including at least one axially extending mounting tab. An electrical conductor has an outer radial end, an inner radial end and at least one retainer, the at least one retainer being engageable with the at least one mounting tab to releasably couple the conductor with the insulator. The conductor outer radial end and/or a portion of the conductor between the outer and inner ends is conductively engageable with the housing and the conductor inner radial end is conductively engageable with the shaft so as to provide a conductive path between the shaft and the housing.

Preferably, the insulator has a centerline and a plurality of the mounting tabs extending axially along and spaced circumferentially about the centerline and the conductor includes an electrically conductive disk coupled with the insulator so as to be axially adjacent to the bearing. The disk has an outer radial end engageable with the housing inner surface, an inner radial end defining a central opening for receiving a portion of the shaft and a plurality of through holes and retainer prongs spaced circumferentially about a conductor centerline. Each disk through hole receives a separate one of the plurality of mounting tabs of the insulator and each adjacent prong lockingly engages with a separate one of the tabs to releasably couple the conductor with the insulator. Further, an annular conductive brush subassembly is coupled with the conductive disk and includes a plurality of electrically conductive fibers, the conductive fibers being spaced circumferentially about the conductor centerline and extending radially inwardly from the inner end of the conductive disk. Each conductive fiber has an inner end contactable with the shaft outer surface so as to provide a conductive path between the shaft and the disk.

BRIEF DESCRIPTION OF THE SEVERAL VIEWS OF THE DRAWING

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 9A and 9B, collectively FIG. 9, are each a broken-away, axial cross-sectional view of the components of an insulator during assembly onto a bearing outer ring;

FIG. 10, are each a broken-away, axial cross-sectional view of an upper portion of the insulator and the conductor during coupling of the conductor onto the insulator; and FIG. 11 is an enlarged, broken-away axial cross-sectional view of the combination insulator and conductor assembly, shown installed on a shaft and within a housing and engaged by a machine component.

DETAILED DESCRIPTION OF THE INVENTION

Figure 1:
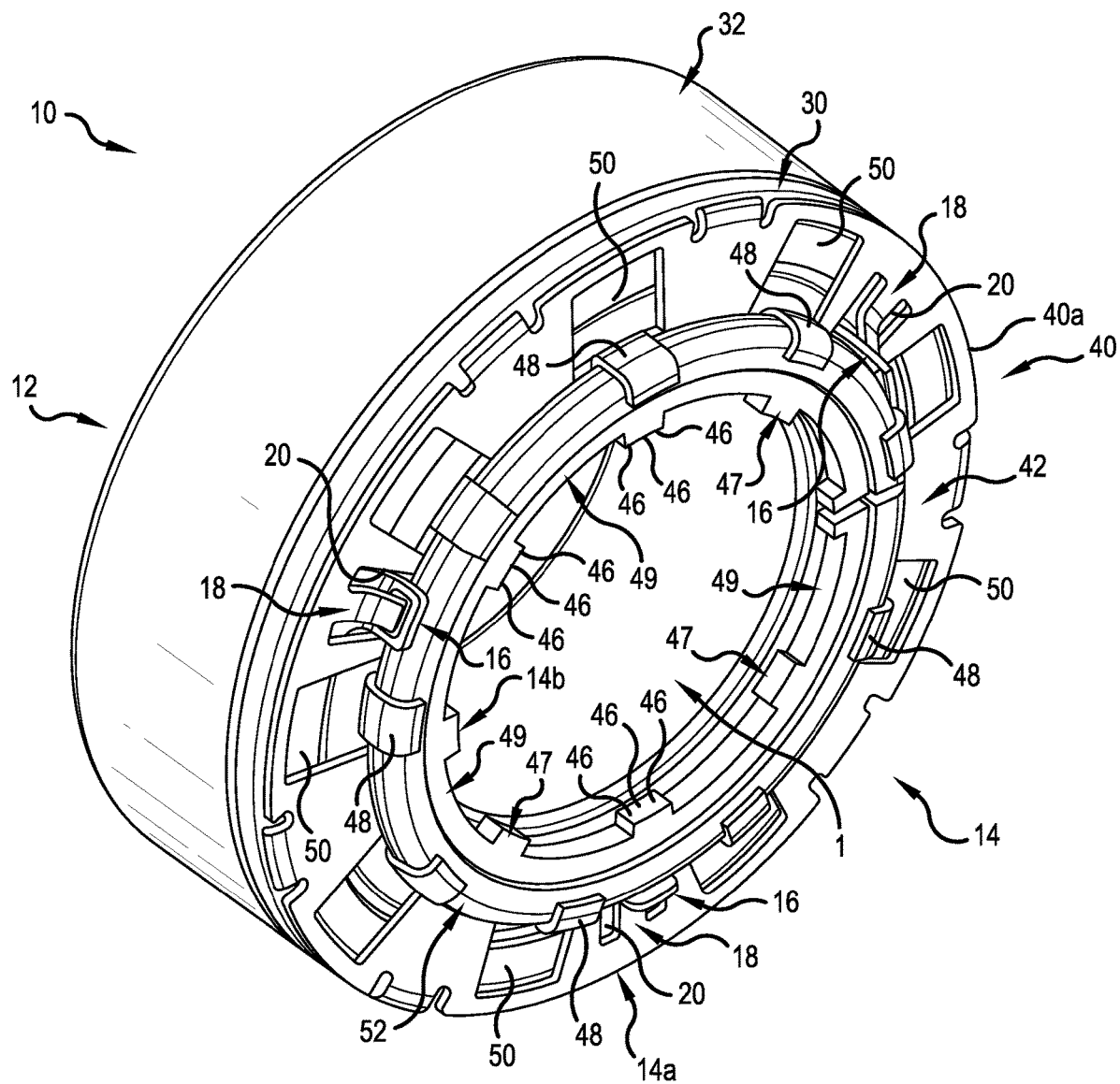
FIG. 1 is a perspective view of a combined insulator and conductor assembly, shown installed on a bearing.
Figure 2:
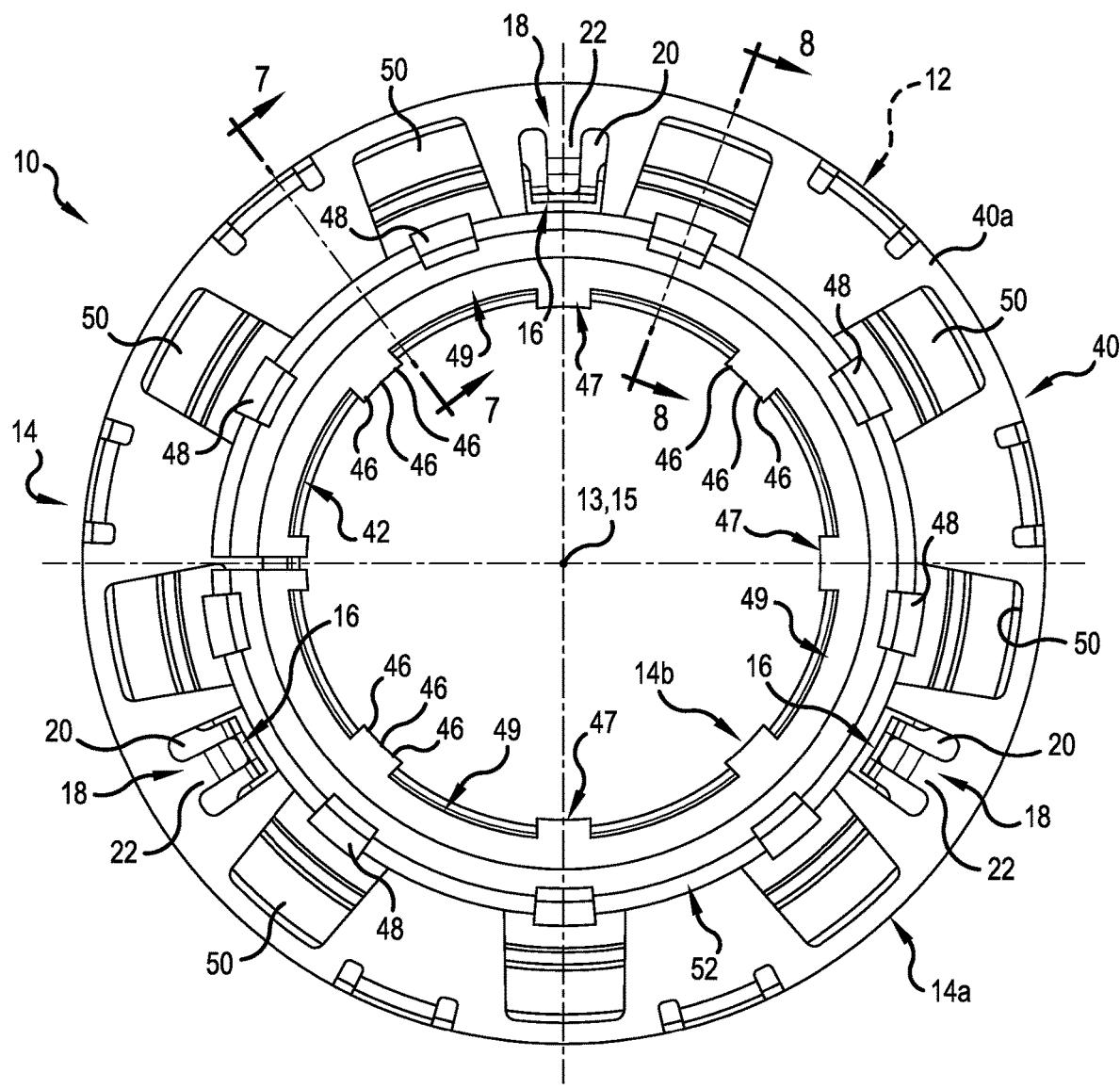
FIG. 2 is a front plan view of the combined insulator and conductor assembly.
Figure 3:
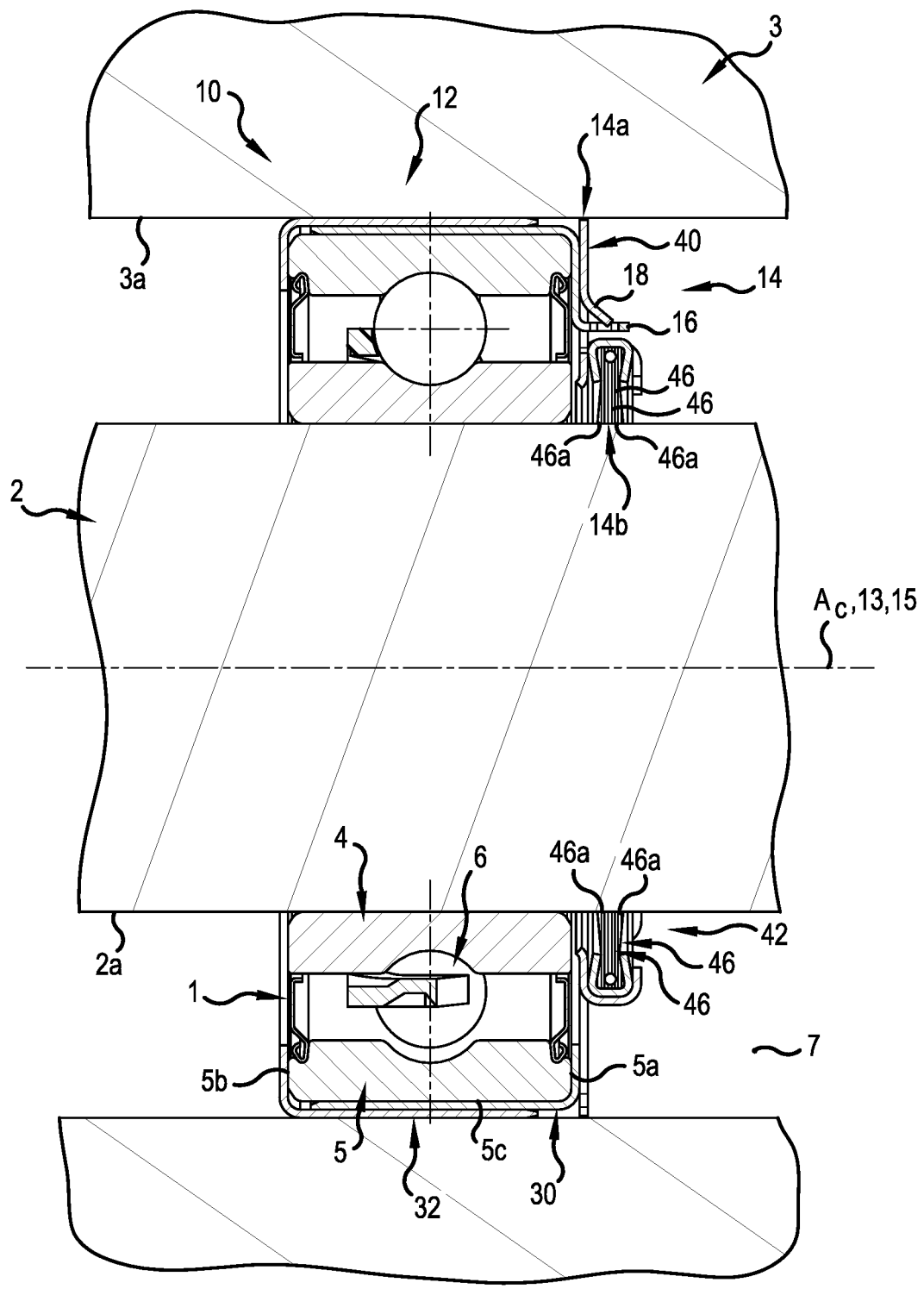
FIG. 3 is an axial cross-sectional view of the combination insulator and conductor assembly, shown installed on a shaft and within a housing.
Figure 4:
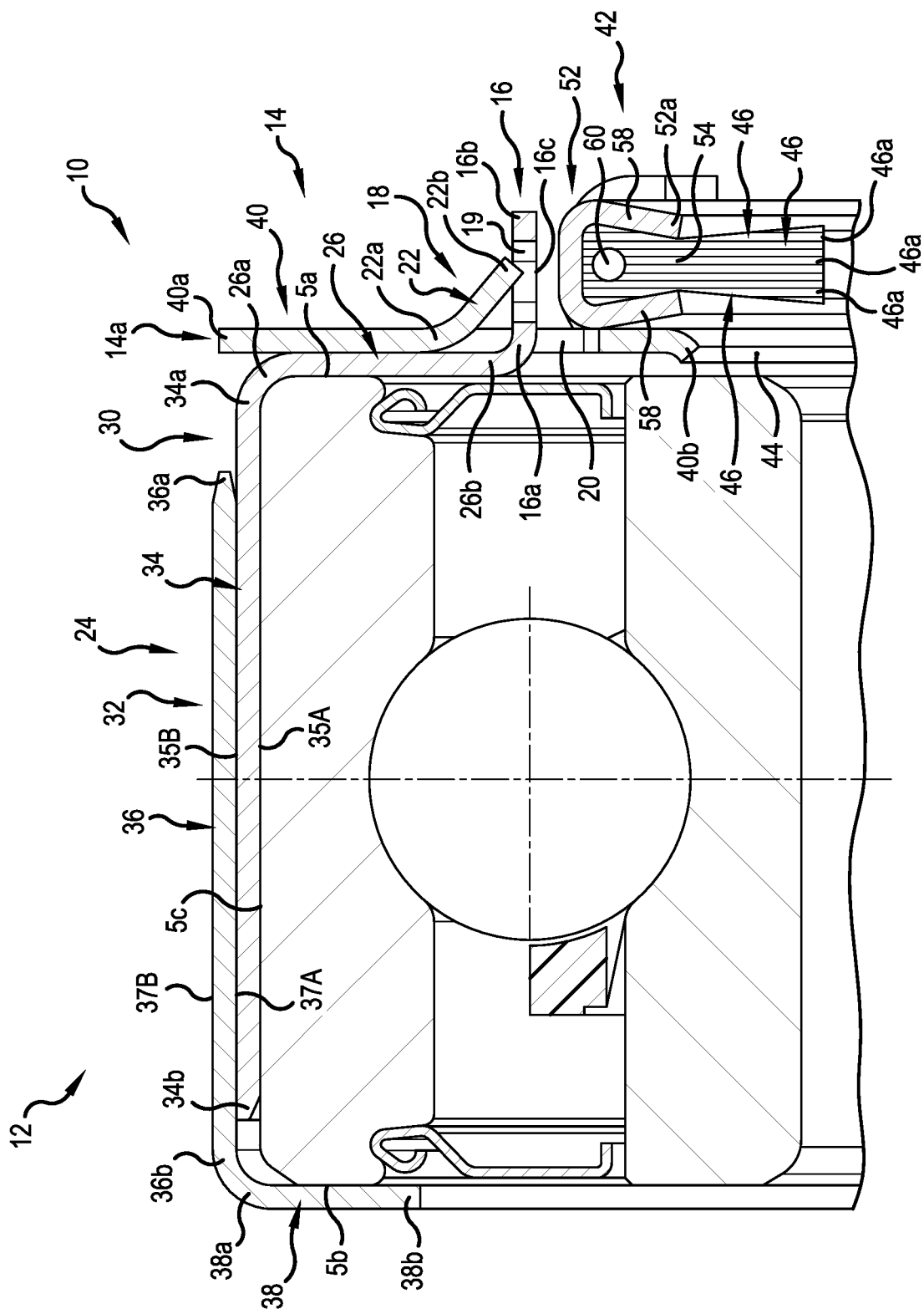
FIG. 4 is a broken-away, enlarged axial cross-sectional view of an upper portion of the combined insulator and conductor assembly installed on a bearing.
Figure 5:
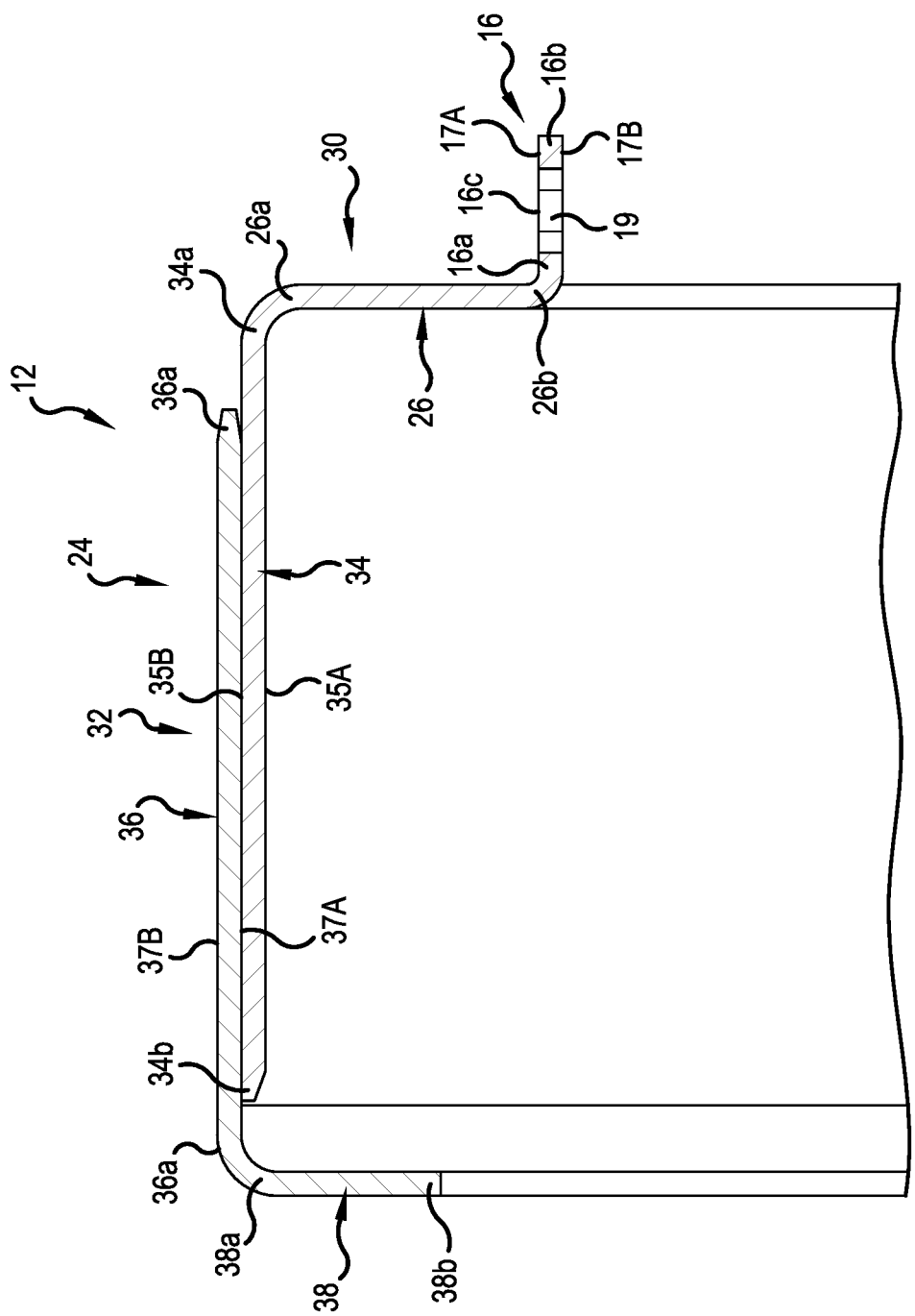
FIG. 5 is broken-away, enlarged axial cross-sectional view of an upper portion of an insulator.
Figure 6:
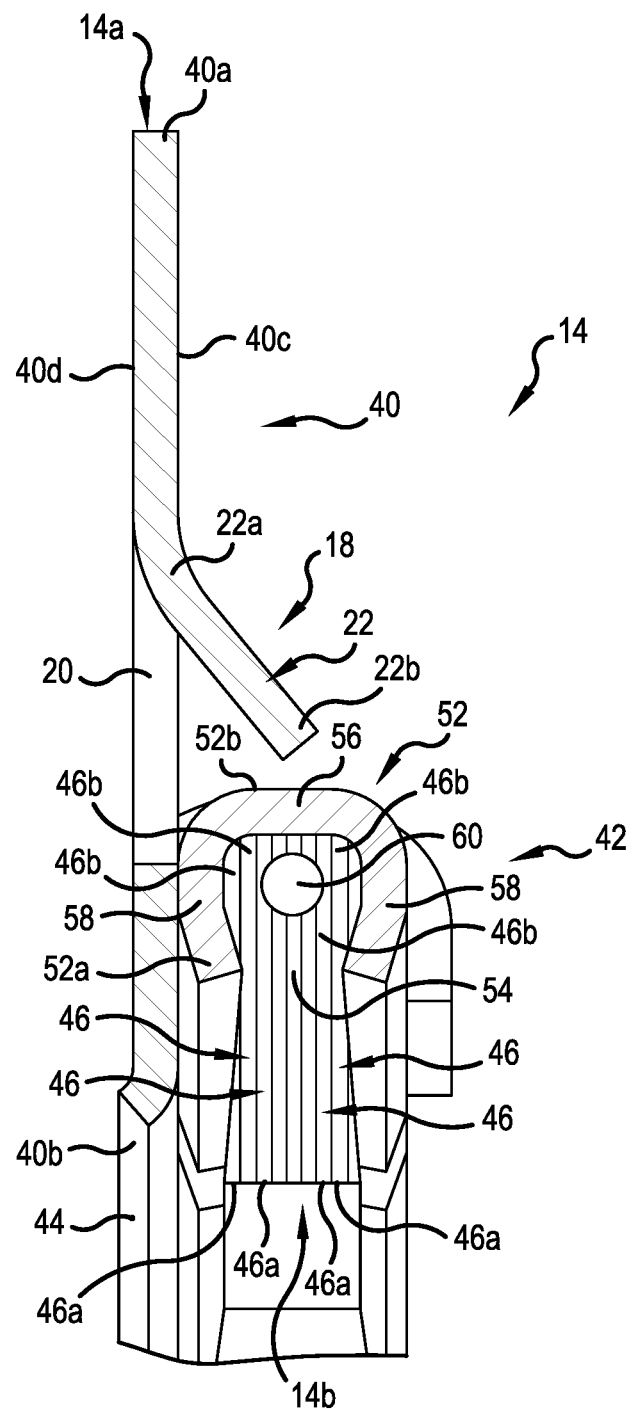
FIG. 6 is a broken-away, enlarged axial cross-sectional view of an upper portion of a conductor.
Figure 8:
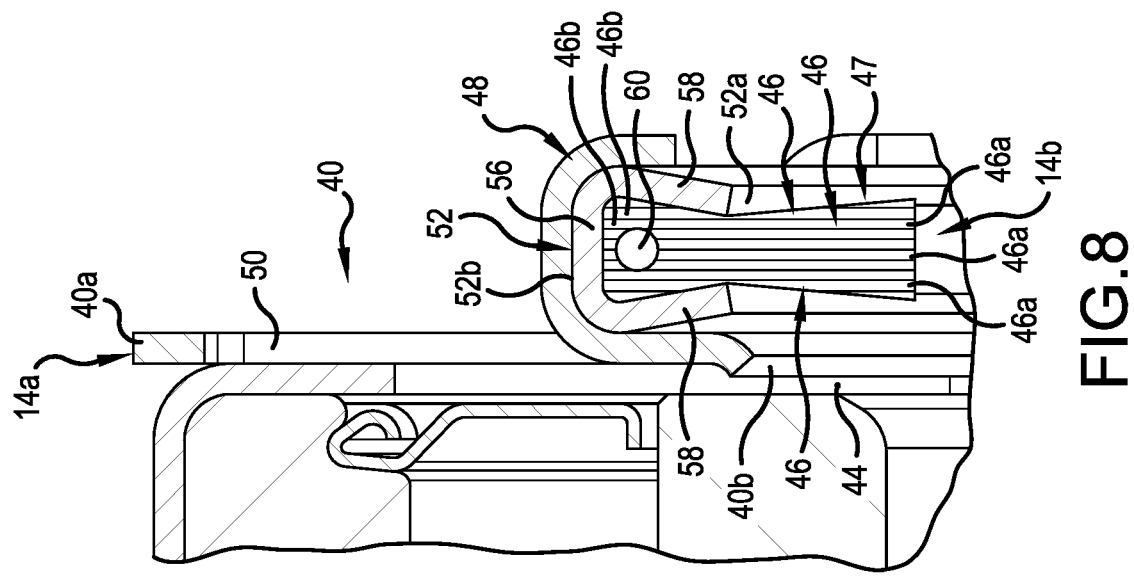
FIG. 8 is view through line 8-8 of FIG. 2.
Figure 7:
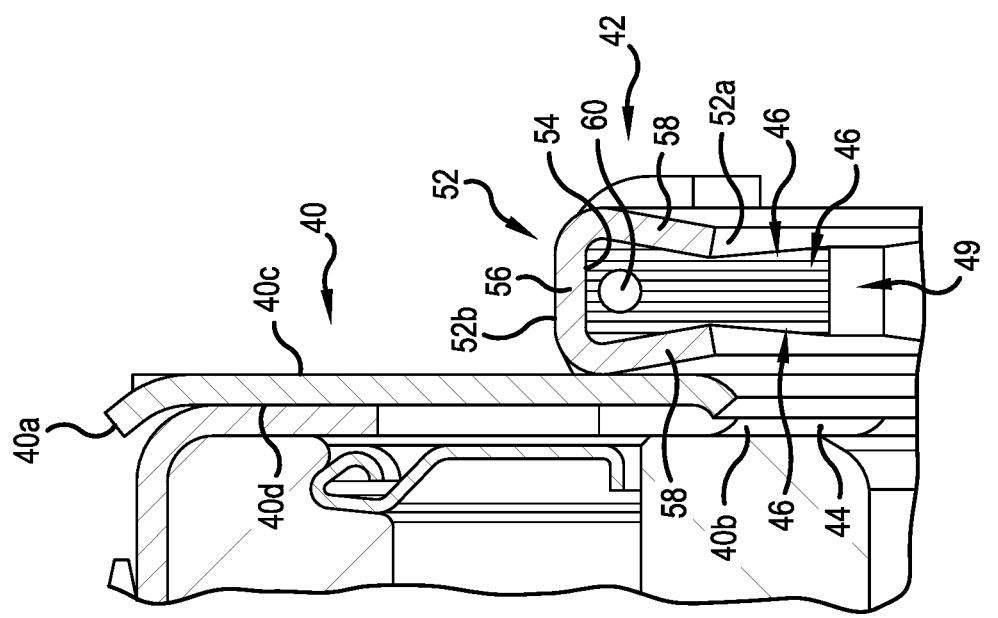
FIG. 7 is view through line 7-7 of FIG. 2.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a combined electrical insulator and conductor assembly 10 for a bearing 1 disposable between a shaft 2 rotatable about a central axis $A_C$ and a housing 3. The bearing 1 has an inner ring 4, an outer ring 5 with opposing first and second axial ends 5a, 5b, respectively, and an outer surface 5c, and a plurality of rolling elements 6 disposed between the rings 4 and 5. The shaft 2 has an outer circumferential surface 2a, which is provided by the shaft 2 itself or by a sleeve or other component (none shown) installed on the shaft 2, and at least the surface 2a, preferably the entire shaft 2 and/or sleeve/component, is electrically conductive. Also, the housing 3 has an inner circumferential surface 3a defining a bore 7, which may be a surface of the main housing 3 itself or an annular component disposed within the housing 3. Preferably, the bearing 1, the shaft 2 and the housing 3 are components of a motor or other electrical machine (e.g., a generator) or any other machine having rotating components likely to accumulate electric charge or convey electric current.

The combined insulator and conductor assembly 10 basically comprises an annular insulator 12 disposable about the bearing outer ring 5 and an electrical conductor 14 releasably coupled with the insulator 12. The insulator 12 is configured to prevent electric current flow between the bearing outer ring 5 and the housing 3 and between the ring 5 and the conductor 14, and thus through the bearing 1, and includes at least one axially extending mounting tab 16. The electrical conductor 14 has an outer radial end 14a, an inner radial end 14b configured to receive the shaft 2 and at least one retainer 18, the at least one retainer 18 being engaged with the at least one mounting tab 16 to releasably couple the conductor 14 with the insulator 12.

More specifically, the conductor 14 has at least one through hole 20 located radially inwardly of the at least one retainer 18 and the at least one mounting tab 16 of the insulator 12 extends through the through hole 20. The at least one retainer 18 preferably includes a radial prong 22 having an outer radial end 22a connected with a remainder of the conductor 14 and a free, inner radial end 22b lockingly engaged with the mounting tab 16, as described in detail below. Further, the conductor outer radial end 14a and/or a portion of the conductor 14 between the outer and inner ends 14a, 14b, respectively, is conductively engageable with the housing 3 and the conductor inner radial end 14a is conductively engageable with the shaft 2 so as to provide a conductive path between the shaft 2 and the housing 3. As used herein, the term "conductively engageable" means establishing an electrically conductive path through direct contact, e.g., conductor outer end 14a and housing inner surface 3a, or through contact with one or more intermediate components or members 8 (FIG. 11) so as to enable electric current to flow between the engaged members, in particular the conductor 14 and the housing 3.

Preferably, the insulator 12 has a centerline 13 and includes an annular body 24 with a radial flange 26 disposeable against the first axial end 5a of the bearing outer ring 5. The at least one mounting tab 16 has an inner axial end 16a integrally formed with the flange 26 and a free, outer axial end 16b spaced outwardly from the inner end 16a along the centerline 13. The conductor 14 has a centerline 15 and preferably includes a conductive disk 40 and a conductive brush subassembly 42 coupled with the disk 40, as described in detail below, the disk 40 providing the at least one through hole 20 and the at least one retainer 18/prong 22. Preferably, the prong 22 of the at least one retainer 18 is provided by an integral portion of the disk 40, which is preferably formed by cutting and forming of the disk 40 as discussed below, such that each prong 22 is elastically bendable with respect to a remainder of the conductive disk 40. When the conductor 14 is coupled with the insulator 12, the at least one mounting tab 16 extends through the at least one conductor hole 20. As such, the conductive disk 40 is located axially between the tab inner and outer ends 16a, 16b, respectively, with the inner end 22b of the retainer prong 22 preferably being lockingly engaged with an axially outer portion 16c (FIG. 4) of the tab 16, as described below.

Further, the insulator 12 preferably has a centerline 13 and a plurality of the mounting tabs 16, most preferably three tabs 16, extending axially along and spaced circumferentially about the centerline 13. Similarly, the conductor 14 preferably has a centerline 15 and a plurality of the retainers 18, most preferably three retainers 18 spaced circumferentially about and extending generally toward the centerline 15. Each one of the plurality of the retainers 18 is engaged with a separate one of the plurality of insulator mounting tabs 16 to releasably couple the conductor 14 with the insulator 12.

Furthermore, the conductive disk 40 has an outer radial end 40a providing the conductor outer end 14a, an inner radial end 40b defining central opening 44 for receiving a portion of the shaft 2, and first and second axial ends 40c, 40d, respectively. The retainer prongs 22 and through holes 20 are located radially between the disk inner and outer ends 40a, 40b and the through holes 20 extend between the first and second axial ends 40c, 40d. The conductive brush subassembly 42 has a plurality of electrically conductive fibers 46 spaced circumferentially about the conductor centerline 15 and extending radially inwardly from the inner end 40b of the conductive disk 40. Each conductive fiber 46 is preferably formed of carbon and has an inner end 46a contactable with the shaft outer surface 2a, such that the fiber inner ends 46a collectively provide the conductor inner radial end 14b. As the disk 40 is configured to provide a conductive path between the brush subassembly 42 and the housing 3, any current or charge on the shaft 2 is directed to flow through the assembly 10, rather than through the bearing 1. Thus, the combination insulator and conductor assembly 10 functions to protect the bearing 10 both by preventing direct current flow through the bearing 1 (i.e., due to the insulator 12) and by providing an alternative path for current adjacent to the bearing 1 by means of the conductor 14. Having described in basic structure and functions above, these and other components of the assembly 10 are discussed in detail below.

Referring now to FIGS. 3-5, 9 and 10, the annular body 24 of the insulator 12 preferably includes an inner annular body 30 disposed directly about the bearing outer ring 5 and providing the radial flange 26 as discussed above, and an outer annular body 32 disposed about the inner body 30, each body 30, 32 preferably being formed of a relatively thin metallic material. Specifically, the inner annular body 30 has a tubular portion 34 disposable about the outer circumferential surface 5c of the bearing outer ring 5 and the flange 26 extends radially inwardly from the tubular portion 34. The tubular portion 34 has opposing first and second axial ends 34a, 34b and inner and outer circumferential surfaces 35A, 35B, respectively, the inner circumferential surface 35A being frictionally engageable with the outer surface 5c of the outer ring 5 to retain the insulator 12 disposed about the bearing 1. The flange 26 is disposeable against the first axial end 5a of the bearing outer ring 5 and has an outer radial end 26a integrally formed with the first end 34a of the tubular portion 34 and an inner radial end 26b. The one or more mounting tabs 16 are integrally formed with the flange inner end 26a and extend axially away from the remainder of the insulator 12 (and thus the bearing 1 when installed). Furthermore, each mounting tab 16 is preferably generally rectangular has a radially-outer and radially-inner surfaces 17A, 17B, respectively, and an opening 19 extending radially between the outer and inner surfaces 17A, 17B.

Further, the outer annular body 32 includes a tubular portion 36 disposed about the tubular portion 34 of the inner annular body 30 and a radial flange 38 extending inwardly from the tubular portion 36. The tubular portion 36 has opposing first and second axial ends 36a, 36b, respectively, and inner and outer circumferential surfaces 37A, 37B, respectively. The inner circumferential surface 37A is frictionally engageable with the outer circumferential surface 35B of the inner body tubular portion 34 to couple the outer body 32 with the inner body 30. Preferably, the outer circumferential surface 37B of the outer body 32 is frictionally engageable with the housing inner surface 3a to axially retain the bearing 1 and the assembly 10, but the outer surface 37B may be merely disposed against/within the housing inner surface 3a without frictional engagement. Further, the radial flange 38 is disposeable against the bearing second axial end 5b and has an outer radial end 38a integrally formed with the tubular body second axial end 36b and an inner radial end 38b. Thus, the installed insulator 12 "encases" the axial ends 5a, 5b and outer surface 5c of the bearing outer ring 5 to electrically isolate the bearing 1 from the housing 3.

Preferably, each of the inner and outer body portions 30, 32 is preferably formed of aluminum and one or more of the inner body inner circumferential surface 35A, the inner body outer circumferential surface 35B, the outer body inner circumferential surface 37A or/and the outer body outer circumferential surface 37B is provided with an insulative layer (none indicated). Most preferably, the one or more insulative layers are each an anodized aluminum layer, i.e., formed by anodizing the metal of the body portion(s) 30 and/or 32. However, one or both of the inner and outer body portions 30, 32 may be formed of an electrically insulative material, such as a polymeric material, a ceramic, etc.

Referring to FIG. 9, with the above structure, the preferred two-piece insulator 12 is installed about of bearing outer ring 5 in the following manner. The inner annular body 30 is first installed about the bearing outer ring 5 by inserting the bearing first axial end 5a into the second axial end 34b of the tubular body portion 34, as shown in FIG. 9A, and then sliding the body inner surface 35A about the ring outer surface 5c until the flange 26 is abutted against the ring first axial end 5a. Then, the outer annular body 32 is installed on the inner body 30 by inserting the bearing second axial end 5b into the first axial end 36a of the tubular body portion 36 and then over the second axial end 34b of the inner body tubular portion 34, as shown in FIG. 9A. The inner surface 37A of the outer body tubular portion 36 is slided over the outer surface 35B of the inner body tubular portion 34 until the flange 38 is abutted against the outer ring second axial end 5b, the outer body 32 being retained about the inner body 30 by friction, as discussed above.

Referring to FIGS. 1-4, 6-8, 10 and 11, the conductive disk 40 is generally circular and preferably formed of a conductive metallic material, most preferably aluminum but may be formed of any other appropriate material (e.g., low carbon steel). The one or more through holes 20 and retainer prongs 22 are each preferably formed by cutting a generally C-shaped opening through the disk 40 to form a generally rectangular radial section (not indicated) of the disk 40, and then bending each disk section to extend axially outwardly from the first axial end 40c of the disk 40. As such, each prong 22 is elastically bendable about the prong outer end 22a so as to generally function as a spring due to the elasticity of the preferred metallic material. Preferably, the disk 40 further includes a plurality of mounting tabs 48 spaced circumferentially about the conductor centerline 15, each mounting tab 48 being engaged with the brush subassembly 42 to couple the brush subassembly 42 with the disk 40. Preferably, each mounting tab 48 is formed by cutting (e.g., by die punching) through the disk 40 to form a rectangular tab 48 and a clearance hole 50. Each tab 48 is bended about a brush retainer 52 (described below) of the brush subassembly 42, such that each engaged mounting tab 48 is generally C-shaped, and the clearance holes 50 provide passages for fluids (e.g., lubricants, air, etc.) to flow through the conductive disk 40 so as to pass to and from the bearing 1.

Referring now to FIGS. 4 and 6-8, the conductive brush subassembly 42 preferably includes the annular retainer 52 connected with the conductive disk 40, as described above, and having an open inner radial end 52a with an annular groove 54 and a closed outer end 52b. Each one of the plurality of conductive fibers 46 has an outer radial end 46b disposed within the groove 54 and extends radially inwardly from the retainer 52 and toward the shaft 2. More specifically, the retainer 52 is preferably formed of a conductive metallic material (e.g., aluminum) and has an outer axial base 56 and two opposing radial legs 58, such that retainer 52 has generally C-shaped axial cross-sections. The retainer legs 58 preferably clamp against the outer ends 46b of the conductive fibers 46 to retain the fibers 46 within the groove 54. Further, the brush subassembly 42 preferably includes a circular hoop 60 disposed within the retainer groove 54 and each one of the plurality of conductive fibers 46 is bended about the hoop 60. As such, each conductive fiber 46 is preferably generally U-shaped or V-shaped and has two inner ends 46a contactable with the shaft outer surface 2a. However, each one of the conductive fibers 46 may be arranged to extend as a generally straight strand (not shown) from the outer radial end 46b to the inner radial end 46a.

Furthermore, the plurality of conductive fibers 46 of the brush subassembly 42 are either arranged in a generally continuous ring of fibers (not shown) or preferably as a plurality of circumferentially spaced discrete sets 47 of fibers 46. In the latter preferred case, the sets 47 of fibers 46 are preferably formed by die-cutting a brush assembly 16 including a continuous ring of fibers 46 such that the fiber sets 47 contactable with the shaft 2 are spaced apart by sets 49 of shorter length fibers 46. Also, each conductive fiber 46 is preferably sized having a diameter within the range of five micrometers or microns (5 µm) to one hundred microns (100 µm). Although each conductive fiber 46 is preferably formed of carbon as discussed above, the fibers 46 may alternatively be fabricated of any appropriate electrically conductive material, such as a metallic material, a conductive polymer, etc.

Although the conductor 14 preferably includes the conductive disk 40 and the brush subassembly 42 as described above and depicted in the drawing figures, the conductor 14 may alternatively be formed in any other appropriate manner that is both coupleable with the insulator 12 and capable of providing one or more conductive paths between the shaft 2 and the housing 3. For example, the conductor 14 may include, instead of the brush subassembly 42, a solid ring of a conductive material (not shown) attached to the conductive disk 40 and conductively engageable with the shaft 2, the ring having either a continuous inner circumferential contact surface or a plurality of arcuate contact surface sections provided by radially-inwardly extending projections. As a further alternative, the conductive disk 40 may be formed having an inner end 40*b* contactable with the shaft outer surface 2*a* to provide a direct conductive path between the shaft 2 and the disk 40. The scope of the present invention encompasses these and all other appropriate constructions of the conductor 14 capable of functioning generally as described herein.

Figure 10A:
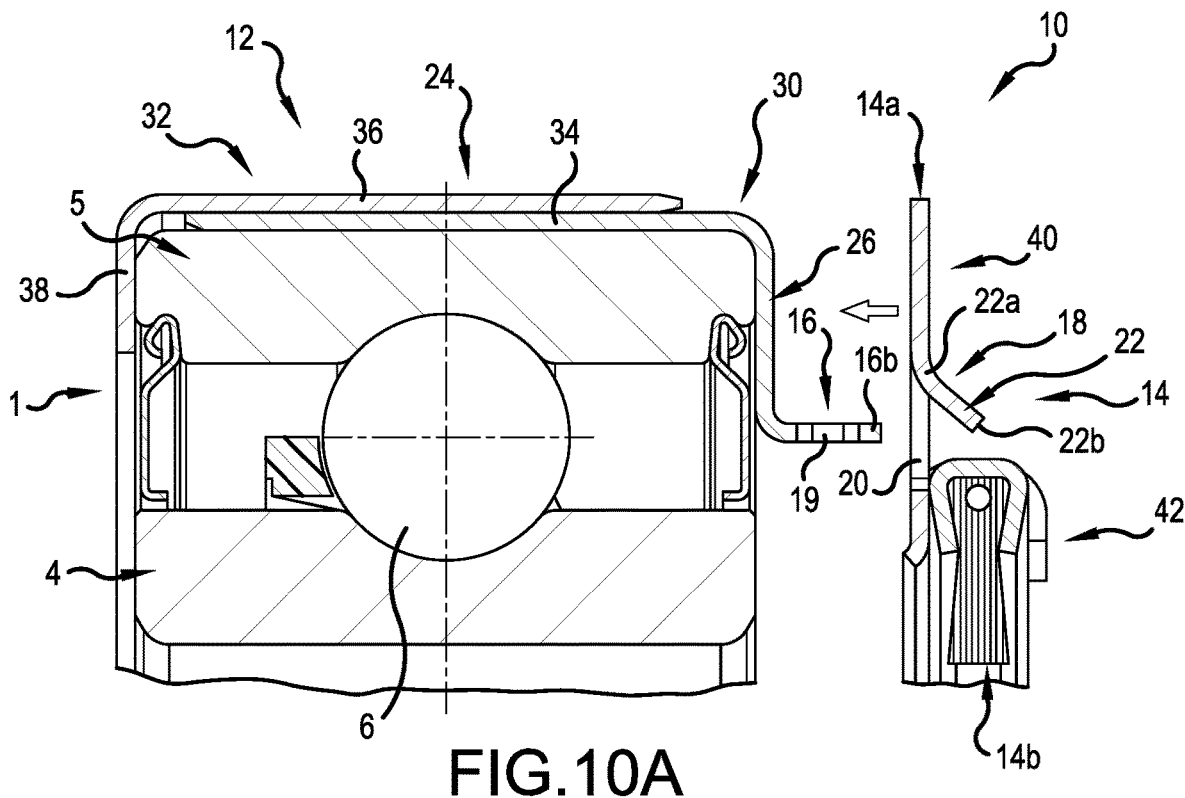
FIGS. 10A and 10B, collectively
Figure 10B:
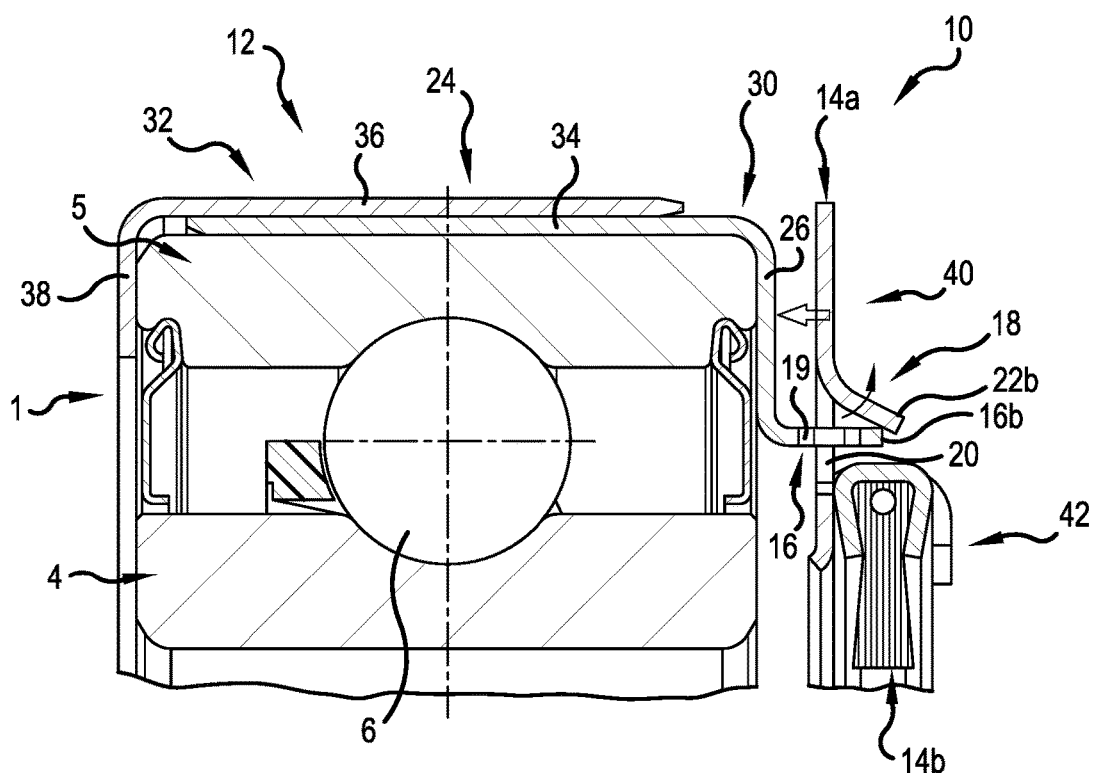

Referring to FIG. 10, the conductor 14 is coupled with the insulator 12 by displacing the conductive disk 40 with attached brush subassembly 42 axially toward the insulator 12 (installed on the bearing 1) until the free axial end 16*b* of each mounting tab 16 enters, then passes through, a separate one of the disk through holes 20. As the disk 40 continues displacing toward the insulator 12 and the bearing 1, each tab free end 16*b* contacts the adjacent retainer prong 22 such that the prong 22 bends radially outwardly, as indicated in FIG. 10B. The prong inner end 22*b* slides over the outer surface 17A of the tab 16 until reaching the tab hole 19, and then the prong 22 "snaps" inwardly back and the prong end 22*b* enters the hole 19 of the mounting tab 16 to lock the prong 22 within the tab 16. At this point, the conductive disk 40, and thus the entire conductor 14, is releasably coupled with the insulator 12, and if it is desired to later remove the conductor 14 from the insulator 12, the prongs 22 must be bended radially outwardly to release the disk 40 from the mounting tabs 16.

The insulator/conductor assembly 10 is more effective at protecting a bearing 1 from damage caused by electric current than previously known devices. The insulator 12 effectively prevents a voltage difference from being established between the shaft 2 and the housing 3 through the bearing 1, such that electric current is prevented from flowing through the inner and outer rings 4, 5 and the rolling elements 6. To further assure that electric current will not pass through the bearing 1, the conductive disk 40 and the brush subassembly 42 provide an alternative path for any charge or current on the shaft 2 to pass through the conductive fibers 46 to the retainer 52, through the retainer 52 and into the conductive disk 40, then passing through the disk outer end 40*a* and into the housing 3.

Additional or alternative conductive paths into the housing 3 may be provided by axial contact between a portion of the housing 3 (e.g., a radial shoulder) or a component 8 (FIG. 11) of the machine disposed within the housing 3, such as a spring, a pin, etc., and either a surface of the conductive disk 40, as shown in FIG. 13, and/or of the brush annular retainer 52. Thus, any charge or current on the shaft 2 in the region of the bearing 1 is both prevented from passing through the bearing 1 by the insulator 12 and shunted to pass through the brush subassembly 42 and the conductive disk 40 of the conductor 14. Further, the assembly 10 may be installed on the bearing 1 by a manufacturer or a distributor, such that a bearing 1 with combined insulator and conductor assembly 10 may be provided to a customer or end user as an entire assembly ready to be installed on a shaft 2 and within a housing 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. The invention is not restricted to the above-described embodiments and may be varied within the scope of the following claims.

We claim:

1. A combined insulator and conductor assembly for a bearing disposable between a shaft and a housing, the bearing having an inner ring, an outer ring with a first axial end and an opposing second axial end, and a plurality of rolling elements disposed between the inner ring and the outer ring, the shaft having an outer circumferential surface and the housing having an inner circumferential surface, the assembly comprising:
   an annular insulator disposable about the bearing outer ring, configured to prevent electric current flow between the outer ring and the housing and including at least one axially extending mounting tab; and
   an electrical conductor having an outer radial end, an inner radial end and at least one retainer, the at least one retainer being engageable with the at least one mounting tab to releasably couple the conductor with the insulator, at least one of the conductor outer radial end and a portion of the conductor between the outer and inner ends being conductively engageable with the housing and the conductor inner radial end being conductively engageable with the shaft so as to provide a conductive path between the shaft and the housing.

2. The assembly as recited in claim 1 wherein the conductor has at least one through hole located radially inwardly of the at least one retainer, the at least one mounting tab of the insulator extends through the through hole, and the at least one retainer includes a radial prong having an outer radial end connected with a remainder of the conductor and a free, inner radial end engaged with the mounting tab.

3. The assembly as recited in claim 2 wherein:
   the insulator has an annular body with a radial flange disposable against the first axial end of the bearing outer ring and the at least one mounting tab has an inner axial end integrally formed with the flange and a free, outer axial end; and
   the conductor includes a conductive disk providing the at least one through hole, the at least one mounting tab extends through the at least one through hole such that the disk is located axially between the mounting tab inner and outer axial ends and the prong of the at least one retainer is provided by an integral portion of the disk.

4. The assembly as recited in claim 1 wherein:
   the insulator has a centerline and a plurality of the mounting tabs spaced circumferentially about the centerline; and
   the conductor has a centerline and a plurality of the retainers spaced circumferentially about the conductor centerline, each retainer being engaged with a separate one of the conductor mounting tabs.

5. The assembly as recited in claim 1 wherein the insulator includes:
an inner annular body having a tubular portion disposed about an outer circumferential surface of the bearing outer ring and a flange extending radially inwardly from the tubular portion and disposable against the second axial end of the bearing outer ring, the at least one mounting tab extending axially outwardly from the flange of the inner body; and
an outer annular body having a tubular portion disposed about the tubular portion of the inner annular body and a flange extending radially inwardly from the tubular portion and disposable against the first axial end of the bearing outer ring.

6. The assembly as recited in claim 5 wherein:
the tubular portion of the inner annular body has opposing inner and outer circumferential surfaces and the tubular portion of the outer annular body has opposing inner and outer circumferential surfaces; and
wherein at least one of the inner annular body and the outer annular body is formed of an electrically insulative material or at least one of the inner body inner circumferential surface, the inner body outer circumferential surface, the outer body inner circumferential surface and the outer body outer circumferential surface is provided with an insulative layer.

7. The assembly as recited in claim 6 wherein:
the inner circumferential surface of the outer body tubular portion is frictionally engaged with the outer circumferential surface of the inner body tubular portion to retain the insulator disposed about the bearing; and
the outer circumferential surface of the outer body tubular portion is frictionally engageable with the housing inner surface to axially retain the bearing within the housing.

8. The assembly as recited in claim 1 wherein the at least one mounting tab of the annular insulator includes a plurality of mounting tabs and the conductor includes:
an electrically conductive disk having an outer end providing the conductor outer end and an inner end defining a central opening for receiving a portion of the shaft, the at least one retainer including a plurality of retainers and each retainer including a separate one of a plurality of deflectable prongs, each retainer prong having an outer radial end integrally formed with a remainder of the disk and a free inner end engageable with a separate one of the insulator mounting tabs; and
an annular conductive brush subassembly coupled with the conductive disk and including a centerline and a plurality of electrically conductive fibers, the conductive fibers being spaced circumferentially about the centerline and extending radially inwardly from the inner end of the conductive disk, each conductive fiber having an inner end contactable with the shaft outer surface so as to provide the conductor inner radial end.

9. The assembly as recited in claim 8 wherein the conductive brush subassembly includes an annular retainer connected with the conductive disk and having an inner radial end with an annular groove, each one of the plurality of conductive fibers having an outer radial end disposed within the groove and extending radially inwardly from the retainer and toward the shaft.

10. The assembly as recited in claim 8, further comprising at least one of:
the conductive disk includes a plurality of additional mounting tabs spaced circumferentially about the centerline, each additional mounting tab being engaged with the brush subassembly to couple the brush subassembly with the carrier;
the brush subassembly further includes a circular hoop disposed within the retainer and each one of the plurality of conductive fibers is bent about the hoop such that each fiber has two ends contactable with the shaft outer surface; and
the plurality of conductive fibers of the brush subassembly are arranged in a plurality of circumferentially spaced discrete sets of fibers.

11. A combined insulator and conductor assembly for a bearing disposable between a shaft and a housing, the bearing having an inner ring, an outer ring with a first axial end and an opposing second axial end, and a plurality of rolling elements disposed between the inner ring and the outer ring, the shaft having an outer circumferential surface and the housing having an inner circumferential surface, the assembly comprising:
an annular insulator disposable about the bearing outer ring, configured to prevent electric current flow between the outer ring and the housing and including at least one axially extending mounting tab;
an electrically conductive disk having an outer radial end, an inner radial end defining a central opening for receiving a portion of the shaft, and at least one retainer engageable with the at least one mounting tab to releasably couple the conductive disk with the insulator, at least one of the conductive disk outer radial end and a portion of the conductor between the outer radial end and the inner radial end being conductively engageable with the housing so as to provide a conductive path between the conductive disk and the housing;
an annular conductive brush subassembly coupled with the conductive disk and including a centerline and a plurality of electrically conductive fibers, the conductive fibers being spaced circumferentially about the centerline and extending radially inwardly from the inner end of the conductive disk, each conductive fiber having an inner end conductively engageable with the shaft so as to provide a conductive path between the shaft and the conductive disk.

12. The assembly as recited in claim 11 wherein the conductive disk has at least one through hole located radially inwardly of the at least one retainer, the at least one mounting tab of the insulator extends through the hole of the conductive disk, and the at least one retainer includes a radial prong having an outer radial end connected with a remainder of the conductive disk and a free, inner radial end engaged with the mounting tab.

13. The assembly as recited in claim 12 wherein the insulator has an annular body with a radial flange disposable against the first axial end of the bearing outer ring and the at least one mounting tab has an inner axial end integrally formed with the flange and a free, outer axial end, the conductive disk being located axially between the mounting tab inner and outer axial ends and the prong of the at least one retainer is provided by an integral portion of the conductive disk.

14. The assembly as recited in claim 13 wherein:
the insulator has a centerline and a plurality of the mounting tabs spaced circumferentially about the centerline; and
the conductive disk has a centerline and a plurality of the radial prongs spaced circumferentially about the disk centerline, each prong being engaged with a separate one of the conductor mounting tabs.

15. The assembly as recited in claim 11 wherein the insulator includes:
an inner annular body having a tubular portion disposed about an outer circumferential surface of the bearing outer ring and a flange extending radially inwardly from the tubular portion and disposable against the second axial end of the bearing outer ring, the at least one mounting tab extending axially outwardly from the flange of the inner body; and
an outer annular body having a tubular portion disposed about the tubular portion of the inner annular body and a flange extending radially inwardly from the tubular portion and disposable against the first axial end of the bearing outer ring.

16. The assembly as recited in claim 15 wherein:
the tubular portion of the inner annular body has opposing inner and outer circumferential surfaces and the tubular portion of the outer annular body has opposing inner and outer circumferential surfaces; and
wherein at least one of the inner annular body and the outer annular body is formed of an electrically insulative material or at least one of the inner body inner circumferential surface, the inner body outer circumferential surface, the outer body inner circumferential surface and the outer body outer circumferential surface is provided with an insulative layer.

17. The assembly as recited in claim 16 wherein:
the inner circumferential surface of the outer body tubular portion is frictionally engaged with the outer circumferential surface of the inner body tubular portion to retain the insulator disposed about the bearing; and
the outer circumferential surface of the outer body tubular portion is frictionally engageable with the housing inner surface to axially retain the bearing within the housing.

18. The assembly as recited in claim 11 wherein the conductive brush subassembly includes an annular retainer connected with the conductive disk and having an inner radial end with an annular groove, each one of the plurality of conductive fibers having an outer radial end disposed within the groove and extending radially inwardly from the retainer and toward the shaft.

19. The assembly as recited in claim 18, further comprising at least one of:
the conductive disk includes a plurality of additional mounting tabs spaced circumferentially about the centerline, each additional mounting tab being engaged with the brush subassembly to couple the brush subassembly with the carrier;
the brush subassembly further includes a circular hoop disposed within the retainer and each one of the plurality of conductive fibers is bent about the hoop such that each fiber has two ends contactable with the shaft outer surface; and
the plurality of conductive fibers of the brush subassembly are arranged in a plurality of circumferentially spaced discrete sets of fibers.

20. A bearing assembly disposable between a shaft and a housing, the shaft having an outer circumferential surface and the housing having an inner circumferential surface, the bearing assembly comprising:
an inner ring;
an outer ring with a first axial end and an opposing second axial end;
a plurality of rolling elements disposed between the inner ring and the outer ring;
an annular insulator configured to prevent electric current flow between the bearing outer ring and the housing and including an inner annular body having a tubular portion disposed about an outer circumferential surface of the bearing outer ring and a flange extending radially inwardly from the tubular portion and disposable against the second axial end of the bearing outer ring, an outer annular body having a tubular portion disposed about the tubular portion of the inner annular body and a flange extending radially inwardly from the tubular portion and disposable against the first axial end of the bearing outer ring, and at least one mounting tab extending axially outwardly from the flange of the inner annular body; and
an electrical conductor having an outer radial end, an inner radial end and at least one retainer, the at least one retainer being engageable with the at least one mounting tab to releasably couple the conductor with the insulator, at least one of the conductor outer radial end and a portion of the conductor between the outer and inner ends being conductively engageable with the housing and the conductor inner radial end being conductively engageable with the shaft so as to provide a conductive path between the shaft and the housing.

* * * * *